United States Patent
Dawson et al.

(10) Patent No.: US 10,416,549 B1
(45) Date of Patent: Sep. 17, 2019

(54) DRY GLASS ERASE PROJECTION BOARD SYSTEM AND METHOD OF USE

(71) Applicants: Dony Dawson, Keller, TX (US); Keven Kirk, Boyd, TX (US)

(72) Inventors: Dony Dawson, Keller, TX (US); Keven Kirk, Boyd, TX (US)

(*) Notice: Subject to any disclaimer, the term of this patent is extended or adjusted under 35 U.S.C. 154(b) by 0 days.

(21) Appl. No.: 15/796,791

(22) Filed: Oct. 28, 2017

Related U.S. Application Data

(60) Provisional application No. 62/414,446, filed on Oct. 28, 2016.

(51) Int. Cl.
| | |
|---|---|
| *G03B 21/62* | (2014.01) |
| *B43L 1/12* | (2006.01) |
| *B43L 1/00* | (2006.01) |
| *G03B 21/625* | (2014.01) |
| *G03B 21/56* | (2006.01) |
| *G03B 21/58* | (2014.01) |
| *G03B 21/60* | (2014.01) |

(52) U.S. Cl.
CPC ............. *G03B 21/62* (2013.01); *B43L 1/002* (2013.01); *B43L 1/12* (2013.01); *G03B 21/56* (2013.01); *G03B 21/58* (2013.01); *G03B 21/60* (2013.01); *G03B 21/625* (2013.01)

(58) Field of Classification Search
CPC .......................................................... B43L 1/12
USPC ......................................................... 359/443
See application file for complete search history.

(56) References Cited

U.S. PATENT DOCUMENTS

| | | | | |
|---|---|---|---|---|
| 3,067,530 A | * | 12/1962 | Bolsey ................. | B43L 1/004 434/425 |
| 3,891,309 A | * | 6/1975 | Bonne .................. | G02F 1/055 349/113 |
| 5,361,164 A | * | 11/1994 | Steliga ................ | B43L 1/004 359/455 |
| 5,655,323 A | * | 8/1997 | Lassoff ................ | G09F 7/08 40/611.1 |
| 6,620,500 B2 | * | 9/2003 | Sweet .................. | B41M 5/52 101/478 |
| 7,901,213 B1 | * | 3/2011 | Beno ................... | B43K 23/001 434/408 |
| 2002/0011380 A1 | * | 1/2002 | Alter ................... | G03B 21/56 181/295 |
| 2004/0252373 A1 | * | 12/2004 | Umeya ................ | G02B 5/3016 359/449 |
| 2005/0112324 A1 | * | 5/2005 | Rosenbaum ........... | B32B 3/30 428/141 |
| 2006/0073466 A1 | * | 4/2006 | Solomon ............... | B43L 1/12 434/408 |

(Continued)

*Primary Examiner* — Clayton E. LaBalle
*Assistant Examiner* — Kevin C Butler
(74) *Attorney, Agent, or Firm* — Eldredge Law Firm, LLC; Richard Eldredge

(57) ABSTRACT

A glass board projection system includes a support board having a front surface with a defined area extending a length and a width; an anti-glare projector board composed of a glass material and that is removably secured to the support board, the projector board having a thickness extending from a front surface to a back surface; an attachment device rigidly attached to and protruding from the back surface of the anti-glare projector board and configured to removably attach to the front surface of the support board; and a gap formed between the support board and the anti-glare projector board, the gap being formed by the attachment device.

13 Claims, 5 Drawing Sheets

(56) References Cited

U.S. PATENT DOCUMENTS

| | | | | |
|---|---|---|---|---|
| 2006/0193042 A1* | 8/2006 | Karlsen | ............... | G03B 21/62 359/443 |
| 2009/0130362 A1* | 5/2009 | Egan | ............... | B43L 1/00 428/41.8 |
| 2009/0273833 A1* | 11/2009 | Shu | ............... | B43L 1/00 359/443 |
| 2010/0092671 A1* | 4/2010 | Goscha | ............... | B43L 1/00 427/256 |
| 2011/0008588 A1* | 1/2011 | Cheng | ............... | G06F 3/045 428/195.1 |
| 2011/0091860 A1* | 4/2011 | Supera | ............... | B32B 37/182 434/409 |
| 2011/0300294 A1* | 12/2011 | Nachtman | ............... | B43L 1/00 427/189 |
| 2013/0101979 A1* | 4/2013 | Shanbour, II | ............... | B43L 1/00 434/408 |
| 2013/0224723 A1* | 8/2013 | Gonzales | ............... | B43L 1/00 434/416 |
| 2013/0314622 A1* | 11/2013 | Braganza | ............... | G02F 1/13718 349/12 |
| 2013/0323707 A1* | 12/2013 | Lyons | ............... | B43L 1/12 434/416 |
| 2014/0272917 A1* | 9/2014 | Hall | ............... | B43L 1/00 434/408 |
| 2015/0343833 A1* | 12/2015 | Van De Broek | ............... | B43L 1/00 434/408 |
| 2017/0206828 A1* | 7/2017 | Lunsford | ............... | G09G 3/2096 |
| 2017/0269466 A1* | 9/2017 | Brown | ............... | B43L 1/12 |

* cited by examiner

DRY GLASS ERASE PROJECTION BOARD SYSTEM AND METHOD OF USE

BACKGROUND

1. Field of the Invention

The present invention relates generally to dry erase glass board used for projector screens, and more specifically, to a glass projector board with a gap disposed between the glass board and a support board.

2. Description of Related Art

Projector screens and/or boards are well known in the art and are effective means to provide means for displaying images from a projector. For example, FIG. 1 depicts a conventional projector system 101 having a projector 103 adapted to emit a light 105 on a front surface 109 of a board 107. It should be understood that a reflective material 113 is typically secured to a back surface 111 of board 107 for an enhanced viewing of the emitted images from projector 103 for a glass or transparent board.

Although effective in most applications of use, it should be understood that significant problems exist when utilizing a glass projector board 107. For example, a plurality of arrows shows the beam of light being diffracted from board 107 as an image is displayed thereagainst. This disadvantage could create a halo and backscatter effect, which in turn affects the image quality.

Great strides in the area of projector boards made of glass have been made; however, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
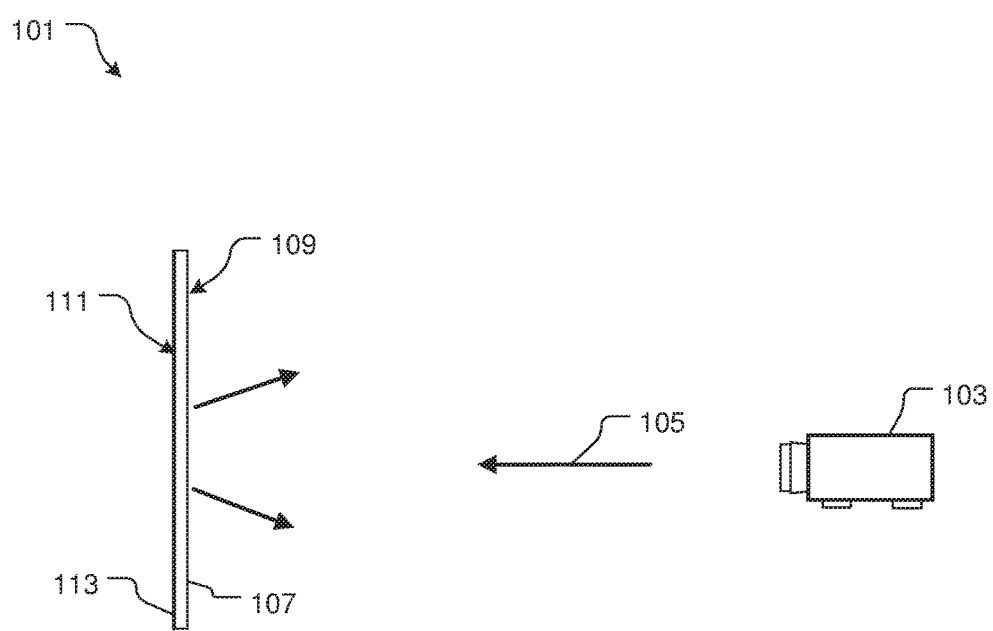
FIG. 1 is a simplified schematic of a conventional projector system.
Figure 2:
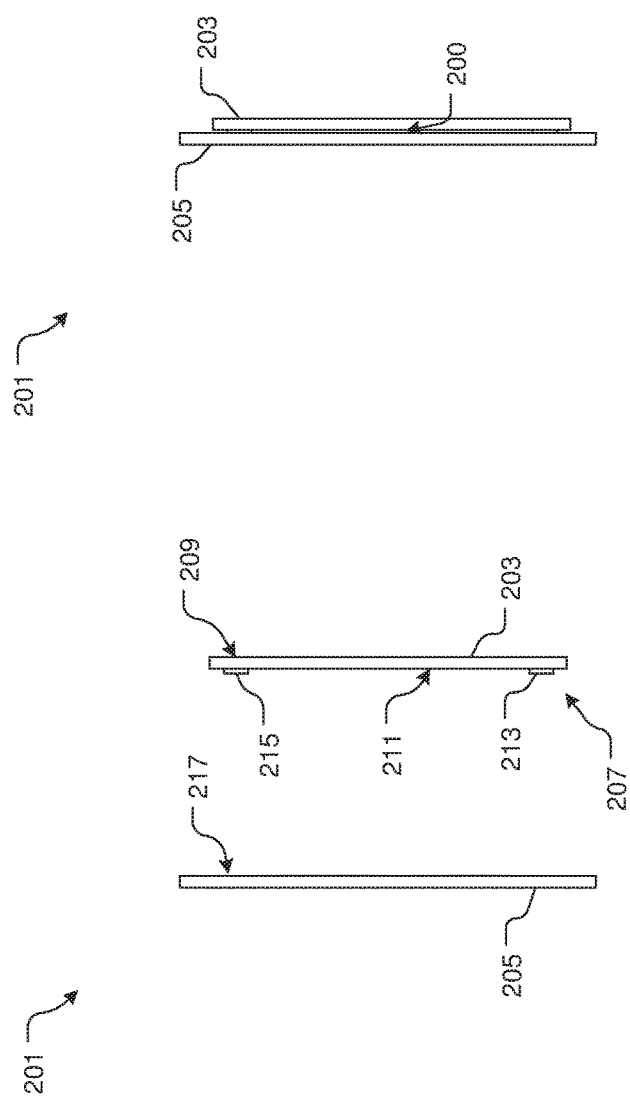
FIGS. 2A, 2B, and 3 are side views of a projector system and method of use in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The system and method of use in accordance with the present application overcomes one or more of the above-discussed problems commonly associated with conventional transparent or glass projector screen systems. Specifically, the system and method of the present application provides effective means to reduce, if not eliminate, the halos and/or backscatter created by conventional glass projector boards. This feature is achieved by creating a minimal gap between the glass board and a supporting board. These and other unique features of the system and method of use are discussed below and illustrated in the accompanying drawings.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1-7 depict various embodiments of projector systems configured to overcome the problems commonly associated with conventional projector systems. It should be understood that the embodiments discussed herein are substantially similar in form and function and share one or more of the features discussed in each embodiment although the features may not be shown specifically with reference to the particular embodiment.

Figure 3:
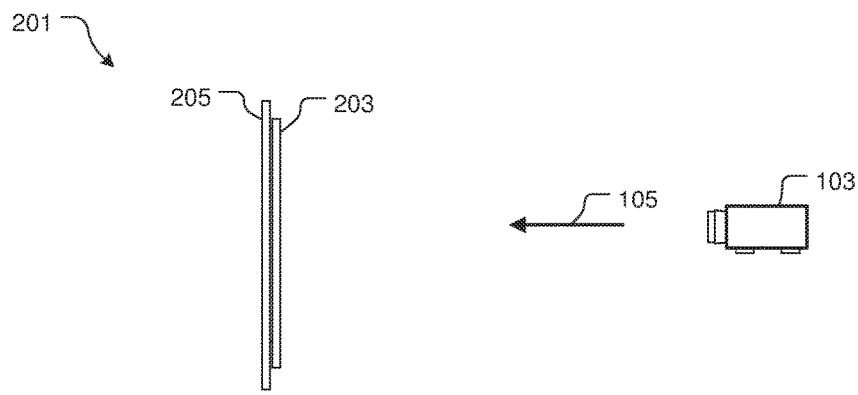

Referring specifically to FIGS. 2A, 2B, and 3 side views of a projector system 201 is shown in accordance with one embodiment of the present invention. System 201 preferably includes one or more of a projector glass board 203 configured to removably secure to a support board 205 via an attachment device 207.

In the preferred embodiment, the projector glass board 203 is composed of a satin type material that reduces glare as light is emitted thereagainst. However, other types of glare-reducing glass material are also contemplated in alternative embodiments. The satin material is preferred for dry-erase capability and should not be too strong otherwise the projection will be solely against surface 209. The projector glass board 203 includes a thickness extending from a front surface 209 to a back surface 211.

The attachment device 207 includes one or more spacers 213, 215 rigidly attached to surface 211 and configured to extend therefrom so as to form a gap 200 between back surface 211 and a front surface 217 of support board 205 and projector glass board 203. In the contemplated embodiment, the spacers 213, 215 are magnets that are magnetically attracted to board 205. However, it will be appreciated that other types of quick-release devices are also contemplated, such as clips, snaps, hook-loop, and the like, in alternative embodiments.

One of the points of novelty believed characteristic of the present invention is the ability to remove the projector board 203 from board 205 via the attachment device 207 for cleaning of surface 217 after use.

Board 205 is preferably composed of a honeycomb material; however, other types of materials are also contemplated. In the contemplated embodiment, surfaces 217 and 211 extend exactly parallel to each other. This feature eliminates shadowing effects during use.

One of the points of novelty believed characteristic of the present invention is the creation of the gap 200 between the two boards. It will be appreciated that the gap 200 provides effective means to reduce, if not eliminate, the adverse halo and/or backscatter as the beam of light travels through the projector glass board 203, as depicted in FIG. 3.

Figure 4:
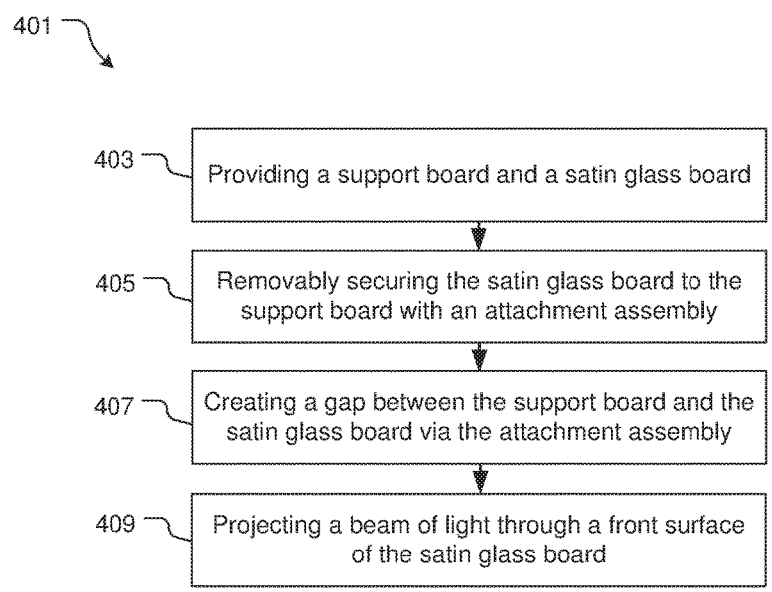
FIG. 4 is a flowchart depicting a preferred method of use.

Referring now to FIG. 4, a flowchart 401 depicts the preferred method of use, which includes manufacturing the system 201 discussed above and creating a gap between the two board. Thereafter assembly of the system 201, a light is projected through the glass board in a front-lit fashion. The anti-glare projector board 203 in combination with the gap provides effective means for projecting a beam of light such as an image, movie, and the like, on projector glass board 203. The satin finish face diffuses the reflection of the projector lens from the view. These features are discussed in boxes 403, 405, 407, and 409 of flowchart 401.

Figure 5:
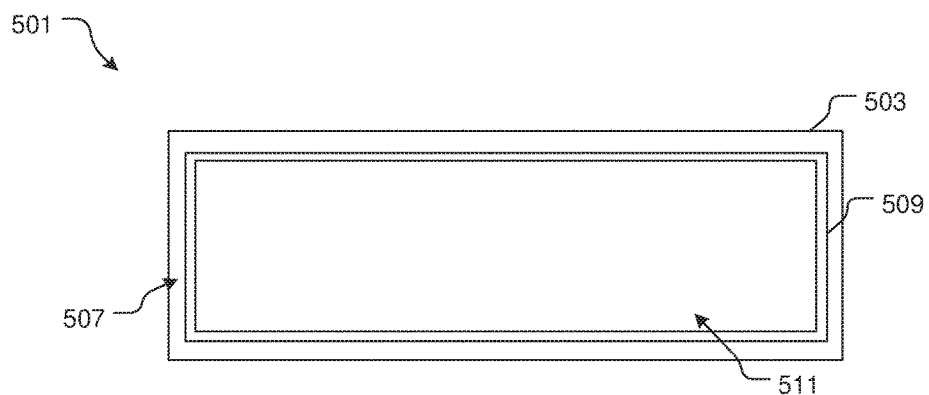
FIG. 5 is a back view of a projector system and method of use in accordance with an alternative embodiment of the present application.
Figure 6:
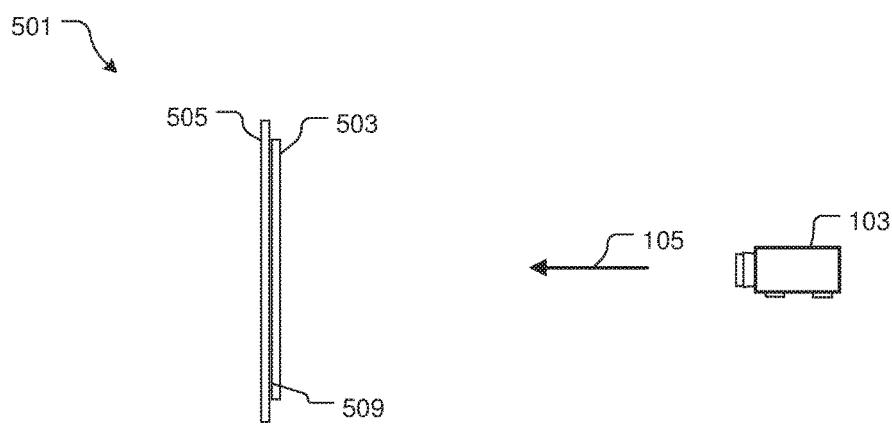
FIG. 6 is a side view of the system of FIG. 5.
Figure 7:
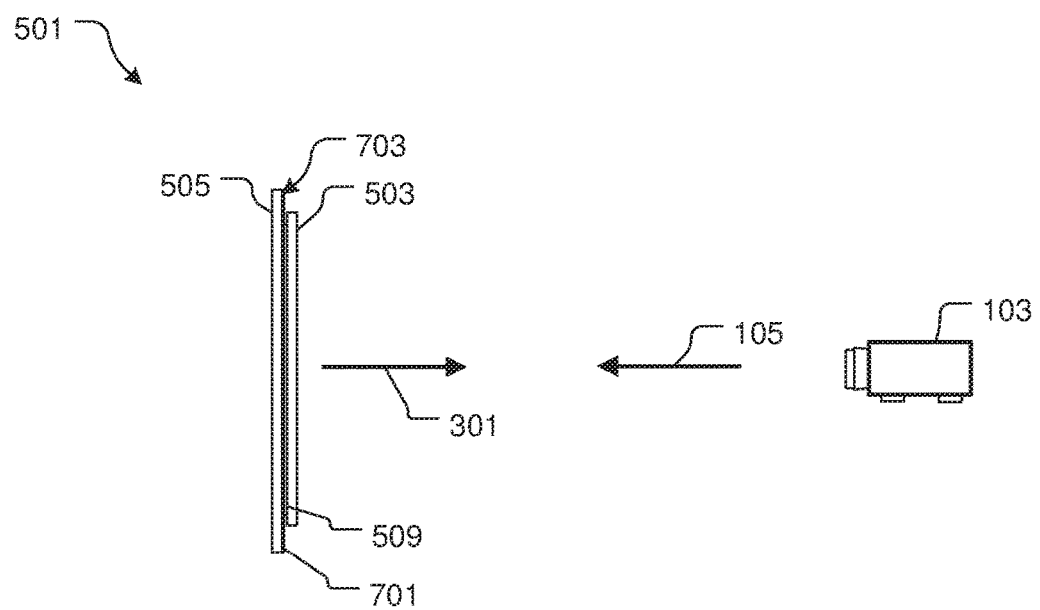
FIG. 7 is a side view of an alternative embodiment of the system of FIG. 6.

Referring now to FIGS. 5-7, an alternative embodiment of system 201 is shown. It will be appreciated that system 501 includes one or more of the features of system 201 an incorporates the same. In the exemplary embodiment, system 501 includes an attachment device 507 having a spacer 509 that peripherally surrounds an enclosed inner area 511 of the back surface of glass board 503. This feature prevents debris and/or unwanted materials from entering into area 511.

In one contemplated embodiment, the attachment device 507 could be rigidly secured between the glass board 503 and the support board 505; however, it is also contemplated having the attachment device removably attached as discussed in system 201.

As shown in FIG. 7, a support board 505 could also include a reflective projecting surface 701, e.g., a fabric material, rigidly secured to and extending the entire length of surface 703 of board 505.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A glass board projection system, comprising:
    a support board having a front surface with a defined area extending a length and a width;
    an anti-glare projector board composed of a glass material and that is removably secured to the support board, the projector board having a thickness extending from a front surface to a back surface;
    an attachment device rigidly attached to and protruding from the back surface of the anti-glare projector board and configured to removably attach to the front surface of the support board, wherein the anti-glare projector board is configured to releasably engage with the support board via the attachment device; and
    a gap formed between the support board and the anti-glare projector board, the gap is created by a thickness of the attachment device.

2. The system of claim 1, the attachment device comprising:
    a first elongated spacer extending the length of the support board; and
    a second elongated spacer extending the length of the support board;
    wherein the first elongated spacer is spaced at a distance from the second elongated spacer.

3. The system of claim 2, wherein the gap creates a channel of air passing through the first elongated spacer and the second elongated spacer.

4. The system of claim 2, wherein the first elongated spacer and the second elongated spacer are magnets; and
    wherein the support board is composed of a metallic material.

5. The system of claim 2, wherein the first elongated spacer and the second elongated spacer are hook-loop fasteners.

6. The system of claim 1, wherein the anti-glare board is composed of a satin glass material.

7. The system of claim 1, further comprising:
    a fabric bonded to the front surface of the support board.

8. The system of claim 1, wherein the attachment device forms a gaseous sealed inner area between the front surface of the support board and the back surface of the anti-glare projector board.

9. The system of claim 8, the attachment device comprising:
    a continuous spacer forming the gaseous sealed inner area;
    wherein air is trapped within the gaseous sealed inner area by the continuous spacer.

10. A method to reduce a halo effect on a glass board, comprising:
    creating a gap between a support board and an anti-glare projector board via an attachment device;
    projecting a beam of light through the front surface of the anti-glare projector board; and
    reducing the halo effect via the gap disposed between the anti-glare projector board and the support board.

11. The method of claim 10, further comprising:
    creating the gap with the attachment device having a first elongated spacer and a second elongated spacer.

12. The method of claim 11, further comprising:
channeling air through the first elongated spacer and the second elongated spacer.

13. The method of claim 10, wherein the attachment device is a plurality of magnets.

* * * * *